United States Patent
Dey et al.

(10) Patent No.: US 10,572,596 B2
(45) Date of Patent: Feb. 25, 2020

(54) REAL-TIME ON-DEMAND AUCTION BASED CONTENT CLARIFICATION

(71) Applicant: International Business Machines Corporation, Armonk, NY (US)

(72) Inventors: Kuntal Dey, New Delhi (IN); Anil U. Joshi, New Delhi (IN); Puthukode G. Ramachandran, Austin, TX (US); Willie L. Scott, II, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/811,793

(22) Filed: Nov. 14, 2017

(65) Prior Publication Data
US 2019/0147041 A1    May 16, 2019

(51) Int. Cl.
*G06F 17/27* (2006.01)
*G06Q 30/02* (2012.01)
(Continued)

(52) U.S. Cl.
CPC ........ *G06F 17/2785* (2013.01); *G06F 17/218* (2013.01); *G06F 17/274* (2013.01);
(Continued)

(58) Field of Classification Search
CPC ............. G06F 17/2735; G06F 17/2765; G06F 17/2795; G06F 17/274; G06Q 30/02; G06Q 30/0241; G06Q 30/0251; G06Q 30/0275
(Continued)

(56) References Cited

U.S. PATENT DOCUMENTS 4,456,973 A * 6/1984 Carlgren ............. G06F 17/2795
                                                         704/9
6,035,336 A * 3/2000 Lu ........................ H04H 20/82
                                                         709/229
(Continued)

FOREIGN PATENT DOCUMENTS

WO    2016053554 A1    4/2016

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Martin Lerner
(74) *Attorney, Agent, or Firm* — Law Office of Jim Boice

(57) ABSTRACT

A method identifies and filters winning clarifications of content. A content clarification server receives a language element from a client computer, and extracts and marks for clarification a concept among the language element. The content clarification server launches an auction bidding process for replacing original language associated with the concept, and receives sponsored alternatives to the original language from multiple content clarification provider servers. The content clarification server generates an organic alternative, and then assigns a score to each of the sponsored alternatives and the organic alternative. Based upon the respective assigned scores, the content clarification server identifies a winning alternative, which is delivered to the client computer as a replacement for the original language associated with the at least one concept.

18 Claims, 6 Drawing Sheets

(51) Int. Cl.
*G06F 17/21* (2006.01)
*H04L 29/08* (2006.01)

(52) U.S. Cl.
CPC .......... *G06Q 30/0275* (2013.01); *H04L 67/02* (2013.01); *H04L 67/10* (2013.01)

(58) Field of Classification Search
USPC .................. 704/1, 9, 10; 707/723, 732, 748; 705/14.4, 14.49, 14.71
See application file for complete search history.

(56) References Cited

U.S. PATENT DOCUMENTS

| | | | |
|---|---|---|---|
| 7,941,436 | B2 | 5/2011 | Popescul et al. |
| 8,117,023 | B2 | 2/2012 | Funakoshi et al. |
| 8,650,265 | B2 | 2/2014 | Broder et al. |
| 9,524,293 | B2 | 12/2016 | Cuthbert et al. |
| 9,633,317 | B2 | 4/2017 | Gabel et al. |
| 9,721,205 | B2 | 8/2017 | Cook et al. |
| 9,721,276 | B2* | 8/2017 | Allen ................ G06Q 30/0275 |
| 9,760,627 | B1 | 9/2017 | Bradley et al. |
| 10,262,381 | B2* | 4/2019 | Allen ................ G06F 17/2785 |
| 2005/0080775 | A1* | 4/2005 | Colledge .......... G06F 17/30867 |
| 2005/0096913 | A1 | 5/2005 | Coffman et al. |
| 2007/0027865 | A1* | 2/2007 | Bartz ................ G06Q 30/0275 |
| 2007/0136222 | A1 | 6/2007 | Horvitz |
| 2008/0243480 | A1* | 10/2008 | Bartz ................ G06F 17/2785 704/9 |
| 2008/0243737 | A1* | 10/2008 | Rieman .................. G06F 15/16 706/18 |
| 2009/0119090 | A1* | 5/2009 | Niu ........................ G06F 17/24 704/1 |
| 2010/0010803 | A1* | 1/2010 | Ishikawa ............ G06F 17/2795 704/9 |
| 2010/0036719 | A1 | 2/2010 | Eklund |
| 2013/0227401 | A1* | 8/2013 | Kandekar ......... G06F 17/30719 715/254 |
| 2013/0232167 | A1* | 9/2013 | Vidra ................ G06F 17/30864 707/769 |
| 2014/0214964 | A1 | 7/2014 | Liyanage et al. |
| 2014/0316764 | A1 | 10/2014 | Ayan et al. |
| 2015/0287096 | A1* | 10/2015 | Jacobsson .......... G06Q 30/0275 705/14.71 |
| 2015/0293905 | A1* | 10/2015 | Wang .................. G06F 17/2785 704/9 |
| 2016/0125087 | A1 | 5/2016 | Mallah et al. |
| 2016/0140958 | A1* | 5/2016 | Heo .................... G06F 17/2785 704/9 |
| 2016/0162472 | A1* | 6/2016 | Lynch ................. G06F 17/2795 715/780 |
| 2016/0306791 | A1 | 10/2016 | Allen et al. |
| 2016/0335676 | A1* | 11/2016 | Freeman ............ G06Q 30/0241 |
| 2018/0373700 | A1* | 12/2018 | Farri ................... G06F 17/2785 |

OTHER PUBLICATIONS

Braslayski et al.; "What Do You Mean Exactly? Analyzing Clarification Questions in CQA", CHIIR'17, ACM Conference On, Mar. 7-11, 2017, pp. 1-4.

Cerquides et al.; "Bidding Languages and Winner Determination for Mixed Multi-Unit Combinatorial Auctions", IJCAI 20th International Joint Conference On, 2007, pp. 1221-1226.

Nakamura et al.; "Diagram Understanding Utilizing Natural Language Text", IEEE 2nd International Conference On, Oct. 20-22, 1993, pp. 614-618.

Schafer et al.; "A Pattern-Based Approach to DSL Development", SPLASH 2011 ACM Workshops On, Oct. 22-27, 2011, pp. 39-45.

IBM Corporation, "IBM AbilityLab TM Content Clarifier", IBM Corporation, 2018, pp. 1-18.

* cited by examiner

REAL-TIME ON-DEMAND AUCTION BASED CONTENT CLARIFICATION

BACKGROUND

The present invention relates to the field of computers, and particularly to computers that receive electronic messages. Still more particularly, the present invention relates to selectively filtering content clarification of content.

Text content is often confusing to a reader. That is, because of cultural or subject-matter vernacular, or even because of poor writing, a passage may not make sense to the reader. For example, the phrase "The etiology of this phenomenon is obscure" is hard to understand. That is, even if the reader knows the definitions of "etiology", "phenomenon", and "obscure", the phrase itself is unclear. Does the phrase mean "We don't know what is happening" based on not knowing what the phenomenon is, or does it mean "We don't know what is causing the event" based on not knowing what the cause is?

The present invention presents one or more technology-based solutions to this problem, in a manner that reduces the workload of a user's computer (thus improving the functionality of that computer), as it reduces network bandwidth consumption between the user's computer and a server (thus improving the functionality of that network).

SUMMARY

In one or more embodiments of the present invention, a method identifies and filters winning clarifications of content. A content clarification server receives at least one language element from a client computer, and then extracts and marks for clarification at least one concept among the at least one language element. The content clarification server launches an auction bidding process for replacing original language associated with the at least one concept. In response to the auction bidding process, the content clarification server receives at least one sponsored alternative to the original language associated with the at least one concept from multiple content clarification provider servers. The content clarification server generates at least one organic alternative to the original language associated with the at least one concept, and then assigns a score to each of the at least one sponsored alternative and each of the at least one organic alternative as a result of analysis by a content clarification application programming interface that is supported by the content clarification server. Based upon the respective assigned scores, the content clarification server identifies a winning alternative among the at least one sponsored alternative and the at least one organic alternative, such that identifying the winning alternative filters out losing alternatives. The content clarification server then delivers, to the client computer, language of the winning alternative as a replacement for the original language associated with the at least one concept. This provides an advantage over the prior art by 1) providing alternative clarifications to a concept found in a passage, while 2) reducing the load on the user's computer and 3) minimizing the impact on the network bandwidth between the content clarification server and the client computer by sending only "winning" clarifications.

In an embodiment of the present invention, the score of the sponsored alternative and the organic alternative is assigned by: assigning a default monetary bid value to each of the at least one organic alternative; applying a function to each of the at least one sponsored alternative and each of the at least one organic alternative based upon one or more factors selected from: (i) compatibility of the alternative with the at least one language element, (ii) information value of the alternative, (iii) simplicity of the alternative, and (iv) monetary bid value; and determining a score for each of the at least one sponsored alternative and each of the at least one organic alternative based upon output of the function. This provides an advantage over the prior art by establishing whether the sponsored alternative or the organic alternative is preferable, thus creating a more efficient process for providing the optimal alternative clarification.

In an embodiment of the present invention, a computer program product filters clarification content. The computer program product includes a non-transitory computer readable storage device having program instructions embodied therewith. The program instructions are readable and executable by a computer to perform a method that includes: receiving, by a content clarification server, at least one language element from a client computer; extracting and marking for clarification, by the content clarification server, at least one concept among the at least one language element; launching, by the content clarification server, an auction bidding process for replacing original language associated with the at least one concept; receiving, in response to the auction bidding process and by the content clarification server, at least one sponsored alternative to the original language associated with the at least one concept from multiple content clarification provider servers; generating, by the content clarification server, at least one organic alternative to the original language associated with the at least one concept; assigning, by the content clarification server, a score to each of the at least one sponsored alternative and each of the at least one organic alternative as a result of analysis by a content clarification application programming interface that is supported by the content clarification server; based upon the respective assigned scores, identifying, by the content clarification server, a winning alternative among the at least one sponsored alternative and the at least one organic alternative, where identifying the winning alternative filters out losing alternatives; and delivering, from the content clarification server to the client computer, language of the winning alternative as a replacement for the original language associated with the at least one concept. This provides an advantage over the prior art by 1) providing alternative clarifications to a concept found in a passage, while 2) reducing the load on the user's computer and 3) minimizing the impact on the network bandwidth between the content clarification server and the client computer by sending only "winning" clarifications.

In an embodiment of the present invention, a computer system includes one or more processors, one or more computer readable memories, and one or more computer readable storage mediums, and program instructions stored on at least one of the one or more storage mediums for execution by at least one of the one or more processors via at least one of the one or more memories. The stored program instructions include: program instructions to receive at least one language element from a client computer; program instructions to extract and mark for clarification at least one concept among the at least one language element; program instructions to launch an auction bidding process for replacing original language associated with the at least one concept; program instructions to receive, in response to the auction bidding process, at least one sponsored alternative to the original language associated with the at least one concept from multiple content clarification provider servers; program instructions to generate at least one organic alternative to the original language associated with the at least one concept; program instructions to assign a score to each of the at least one sponsored alternative and each of the at least one organic alternative as a result of analysis by a content clarification application programming interface that is supported by the content clarification server; program instructions to, based upon the respective assigned scores, identify a winning alternative among the at least one sponsored alternative and the at least one organic alternative, where identifying the winning alternative filters out losing alternatives; and program instructions to deliver, to the client computer, language of the winning alternative as a replacement for the original language associated with the at least one concept. This provides an advantage over the prior art by 1) providing alternative clarifications to a concept found in a passage, while 2) reducing the load on the user's computer and 3) minimizing the impact on the network bandwidth between the content clarification server and the client computer by sending only "winning" clarifications.

DETAILED DESCRIPTION

Figure 1:
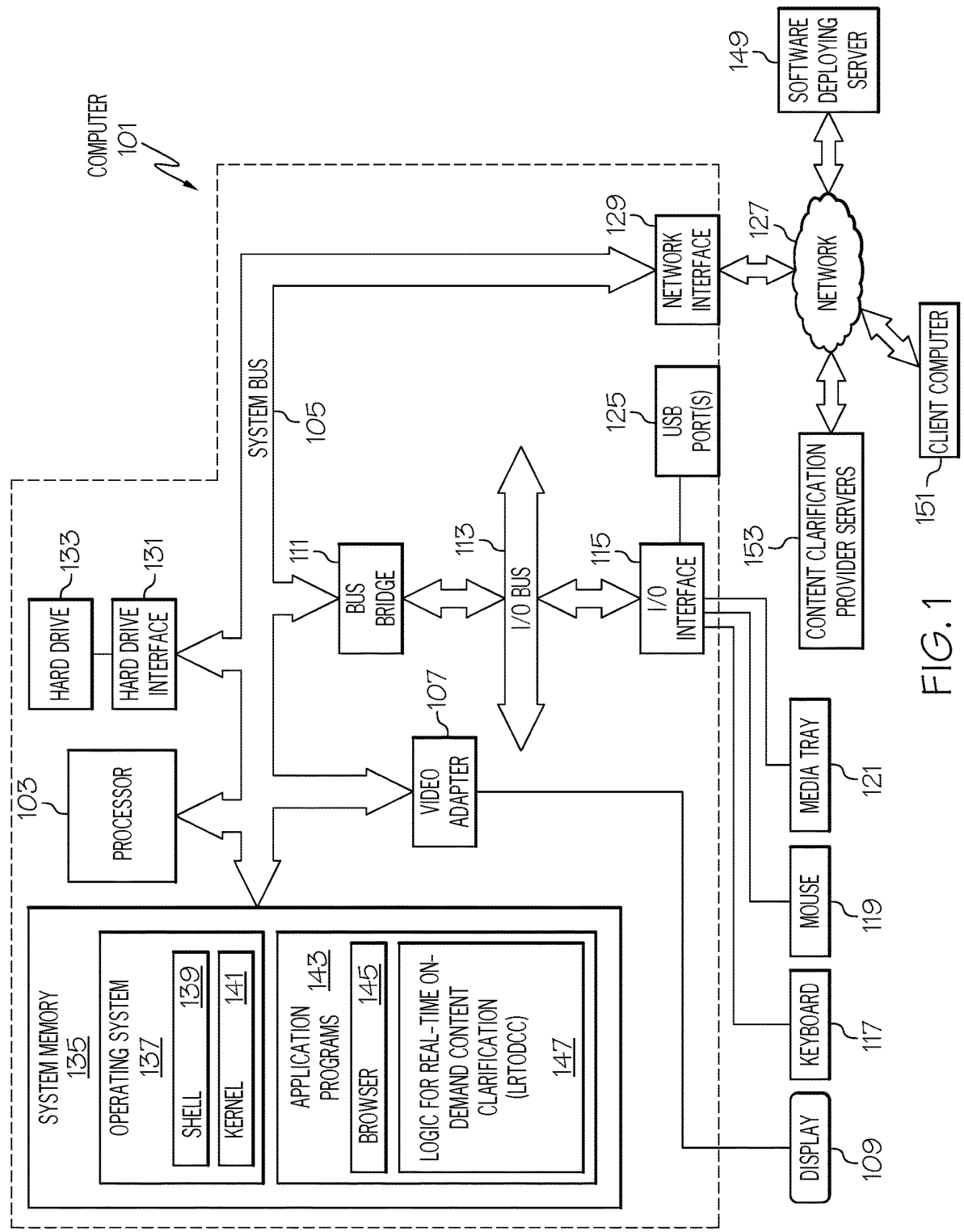
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention discloses a system and associated methods for dynamic content simplification by selecting the single-most relevant content from a mix of organically selected content (which is generated by a content clarification server, preferably based on a profile of a particular user) and sponsored content (which is generated by other content clarification services, preferably in return for a right to display advertisements along with the sponsored content, and which is obtained via a real-time auction process).

In one or more embodiments, the invention is implemented by the following steps and methods.

First, when a user implicitly or explicitly calls for clarification of a given piece of content (word, phrase, sentence, paragraph etc.), a core concept extraction from the content is performed, as well as an abstractive summarization is conducted.

Next, as the concepts are found, they are marked as the concepts for which alternatives are needed. In an embodiment, the entire piece of content is marked as content for which an alternative is needed.

In an embodiment of the present invention, a real-time auction bidding process is launched, where bidders are provided with the concept(s) that need to be replaced, along with the main text (in one or more embodiments), and the bidders respond with (sponsored) alternatives to the concept(s) that need to be replaced.

Next, the responses, processed by an engine situated at the content clarification server, are analyzed for relevance, grammar/semantic structure and gelling with the main content flow, difficulty/simplicity of the content, information content, and the monetary revenue of the bid for the content clarifier engine.

Next, a score is assigned to each response (each "clarified content").

Other content clarification process outputs are also evaluated for the above factors, except that, in absence of a monetary bid, a given (pre-defined) value is assigned to the monetary revenue component, for scoring.

Ultimately, a single content is selected as the winner from a mix of organic and sponsored content, and is delivered to replace the original content on the reader's reading system.

Thus, the present invention discloses a system and associated methods which, in a dynamic content clarification/updating system where a reader implicitly or explicitly makes demands for different/simplified/clarified alternative content, provides (a) a competition for obtaining relevant, simpler, and high quality clarification of content (with at least equal information containment); (b) selection of a single winner from an overall mix of sponsored and organic content available such that the content gels well with the main content that has been called for replacement, is easier (or, of a different difficulty level) than the original content, and has high information content; and (c) enables real-time delivery of the selected component.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a client computer 151 and/or content clarification provider servers 153 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Logic for Real-Time On-Demand Content Clarification (LRTODCC) 147. LRTODCC 147 includes code for implementing the processes described below, including those described in FIGS. 2-4. In one embodiment, computer 101 is able to download LRTODCC 147 from software deploying server 149, including in an on-demand basis, wherein the code in LRTODCC 147 is not downloaded until needed for execution. In one embodiment of the present invention, software deploying server 149 performs all of the functions associated with the present invention (including execution of LRTODCC 147), thus freeing computer 101 from having to use its own internal computing resources to execute LRTODCC 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
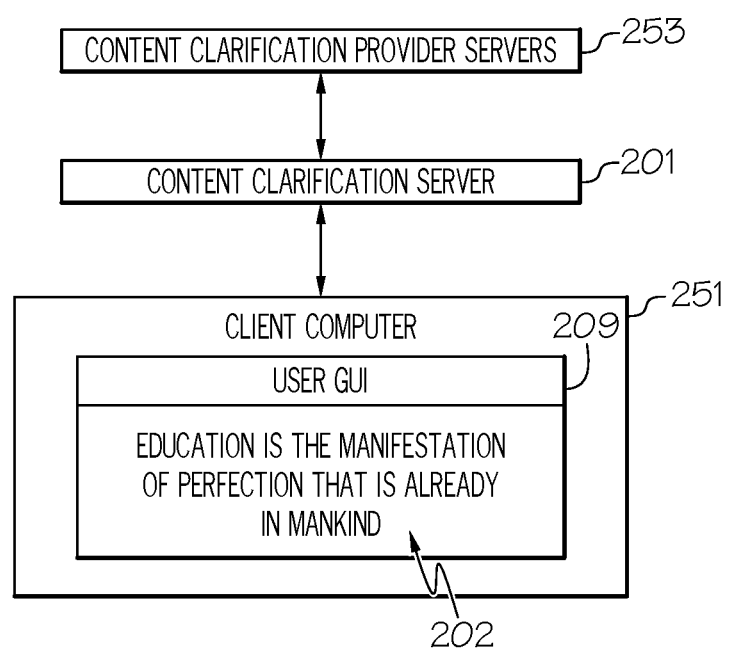
FIG. 2 illustrates a relationship among a client computer, a content clarification server, and content clarification provider servers in accordance with one or more embodiments of the present invention.

With reference now to FIG. 2, assume that a user of client computer 253 (equivalent to client computer 153 shown in FIG. 1) enters content 202 (a word, phrase, sentence, paragraph etc.) into a user graphical user interface (GUI) 209. In one embodiment of the present invention, the content 202 is typed in to the user GUI 209, while in another embodiment the content 202 is already displayed on the user GUI 209, and is simply highlighted (e.g., using a cursor and control keys) by the user. In either embodiment, the user wants content clarification of the content 202.

That is, the phrase "Education is the manifestation of perfection that is already in mankind" may be perfectly clear to some, but not to others. That is, if a person is a subject matter expert in the field of psychology and/or education, then this phrase may make perfect sense. However, for another person, they may not know what is meant by "manifestation of perfection" or what is meant by the term "mankind" when referencing such "perfection". As such, the content clarification server 201 (analogous to computer 101 shown in FIG. 1) will provide content 202 to multiple content clarification providers that use the depicted content clarification provider servers 253 (analogous to content clarification provider servers 153 shown in FIG. 1). These content clarification providers may have their own "spin" (viewpoint) on what is meant by content 202, such that the different content clarifications (viewpoints) are similar but have varied approaches.

In order to initially define/identify/describe content 202, content clarification server 201 will apply a natural language processing to content 202, in order to simplify content 202 into an extracting set of concepts. This generates a seed set of concepts based on word embedding, concept graph based extraction, etc., or may be performed by a term frequency-inverse document frequency (TF-IDF) process that uses a numerical statistic to reflect how important a word is to content 202. Alternatively, the system may use a Latent Dirichlet Allocation (LDA) based process that models a concept/topic of content 202 by using a generative statistical model for a topic model.

A natural language process is further executed to perform abstractive summarization and/or extractive summarization. In abstractive summarization, the system extracts key words from content 202 in order to paraphrase content 202 by using language that is more typical of how persons actually speak. That is, abstractive summarization 1) reduces the number of words in content 202 by 2) paraphrasing content 202. In extractive summarization, the system simply extracts key words from content 202 to create a summary of content 202 that uses the key words from content 202 without paraphrasing the words/terms from content 202. Both the abstractive summarization and the extractive summarization convey the same information that is found in the original content 202, but use fewer words than what are found in content 202.

The concepts thus found and/or abstracted/extracted are marked as the concepts for which alternatives (simpler clarifications) are needed.

In an embodiment, the entire piece of content is marked as content for which an alternative is needed.

The interim output of the system is thus a set of concepts, that include one or more of (a) the whole content 202, (b) one or more concepts found within the main content 202, and, (c) abstracted/extracted summarization, all of which are intended to be used in a subsequent bidding process for content clarification.

A real-time auction bidding process is then launched, in which the bidders (i.e., the content clarification provider logic that is running on the content clarification provider servers 253 shown in FIG. 2) are provided with the following inputs: (a) the whole content; (b) one or more concepts found within the main content; and/or (c) the abstractive/extractive summary of the content for some of the prominent/key concepts.

For the purpose of context and syntactic/semantic consistency, and for grammatically and stylistically gelling with the main content, the bidder is provided with the whole content or a part of the content, including some additional content at the beginning and end in an embodiment for providing better context to the bidder.

The bidders now use in-house sponsored clarified content (ad) generation techniques, such as knowledge bases, natural language generative models etc. using the above inputs, in order to optimize the relevance, grammar/semantic structure of the main content, gel with the main content flow, reduce difficulty and increase simplicity of the content, maximize information content understanding through use of replacement text and concepts, and/or establish an appropriate monetary expense ("bid value"), which may be based on a past bid winning/losing history for additional input in deciding bid values for generated sponsored clarified content.

The penultimate output is thus the bidders' response to the content clarification server 201, which decides which bid (clarified content) to accept. That is, the bidders respond with (sponsored) alternatives to the concept(s)/text fragment that need to be replaced, and the monetary amount (bid value) of the sponsored text. In one or more embodiments of the present invention, each bidder is allowed to respond with zero, one or more <text alternative, bid value> pairs.

The content clarifier engine (e.g., within content clarification server 201) receives the bid responses, in the form of a set of "clarified content"<text alternative, bid value>, and applies a function, where the inputs to the function are 1) relevance with respect to the main content (that needs to be replaced); 2) grammar/semantic structure similarity (acceptability) of the main text that needs to be replaced and the alternative/replacement text; 3) stylistic similarity of the main and alternative content; 4) difficulty/simplicity of the alternative content; 5) information containment of the alternative content; and/or 6) the monetary revenue of the bid for the content clarifier engine.

The final output (i.e., the selected content clarification) of the content clarification server 201 to the client computer 251 is based on a score that is assigned to each response (each "clarified content").

While the "clarified content" is described herein as text, in one or more embodiments of the present invention the "clarified content" may be non-textual information. For example, assume that the content uses the unclear term/concept "interplanetary aeronautical vehicle". The term/concept "interplanetary aeronautical vehicle" could be replace with the text "space ship". In another embodiment, the term/concept "interplanetary aeronautical vehicle" is replaced with (i.e., clarified by) a photograph of a spacecraft, an audio clip counting down to lift off of a spacecraft, a longitude/latitude coordinate pair for the NASA space station in Houston, etc. In this embodiment, such multi-modal information is formatted into a form that can be integrated into the original content such that it is inserted inline into the original content.

In one or more embodiments, traditional content clarification process outputs are also evaluated for the above factors, except that, in absence of a monetary bid, a given (pre-defined) value is assigned to the monetary revenue component, and a score is assigned.

The scores are sorted, and the content with the best score is selected as the single winner from a mix of organic and sponsored content, and is delivered for replacing the original content on the reader's reading system.

In case of a tie, policy-based attribute heuristics (such as, higher bid value, past records of the bidders etc.) can be used for tie-breaking.

Continuing the above example, assume that the main content is "Education is the manifestation of perfection that is already in mankind", and the reader/user seeks clarification of the entire content. The organic content alternative that is initially created by the content clarification server 201 is "Education brings out the perfection inbuilt in humans". An auction is then launched by sending this organic content alternative to the content clarification provider servers 253.

Content provider C1 (one of the content clarification provider servers 253) bids with the content alternative "Education shows the perfection of humans<begin ad><sponsor>C1</sponsor><bid>B1</bid><ad text>(ref: C1)</ad text><end ad>", which means that content provider C1 will responds with clarifying language "Education shows the perfection of humans" along with a condition that an ad from C 1 will be displayed to client computer 251 for a fee B1 that will be paid to the content clarification server 201.

Content provider C2 bids with the content alternative "Education elicits human perfection<begin ad><sponsor>C2</sponsor><bid>B2</bid><ad text>(ref: C2)</ad text><end ad>", which means that content provider C2 will responds with clarifying language "Education elicits human perfection" along with a condition that an ad from C2 will be displayed to client computer 251 for a fee B2 that will be paid to the content clarification server 201.

The organic content alternative, as well as the sponsored content alternatives, are analyzed for relevance, grammar/semantic structure and gelling with the main content flow, difficulty/simplicity of the content, information content, and the monetary revenue of the bid for the content clarifier engine (taken as a given value in the case of organic content alternative), and a score is assigned to each response (each "clarified content").

The content with the highest score is selected as the winner from this mix, and is delivered for replacing the original content on the reader's reading system on client computer 251.

Figure 3:
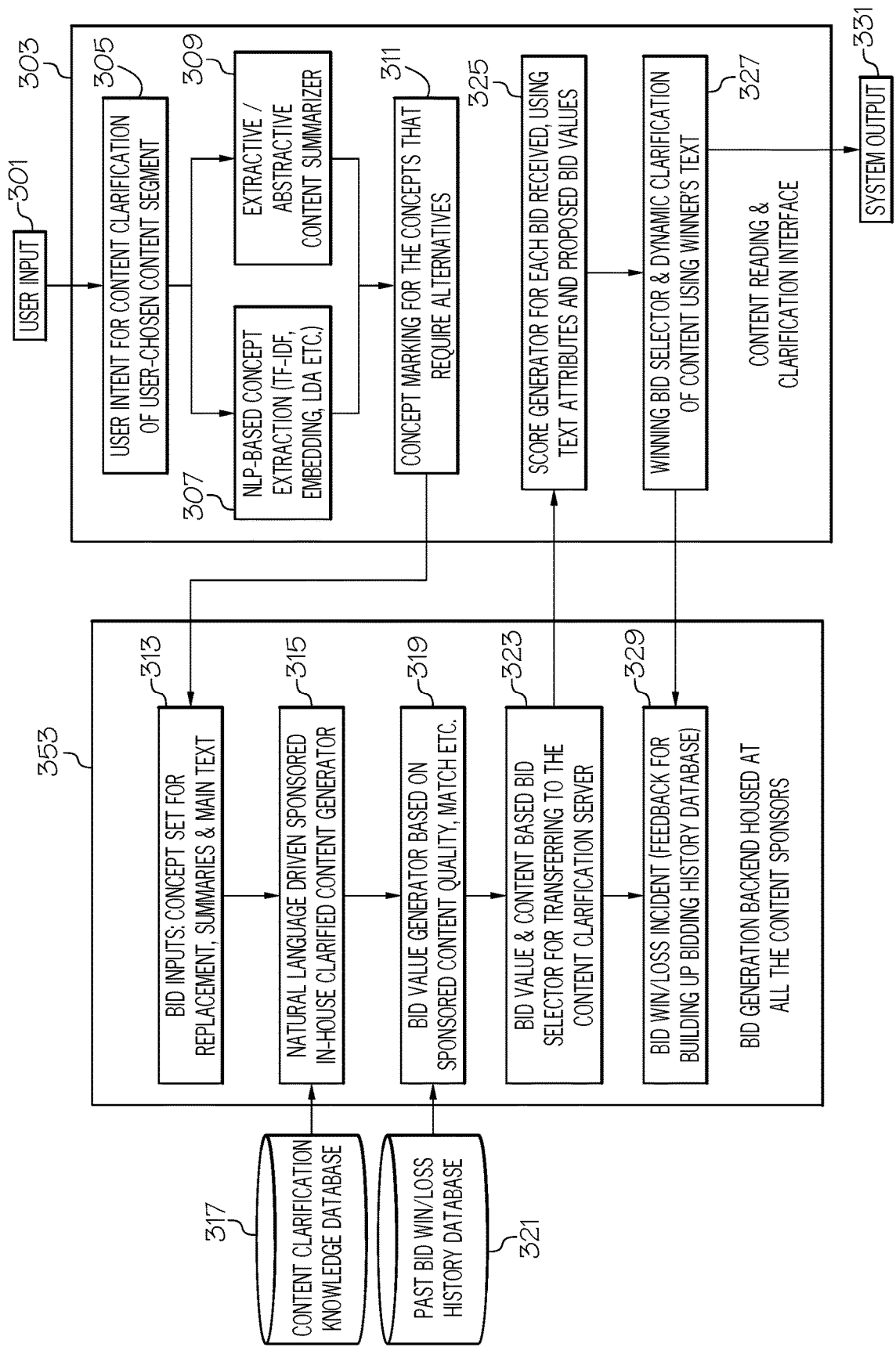
FIG. 3 depicts a process diagram of an exemplary embodiment of the present invention.

With reference now to FIG. 3, an overall flowchart of a preferred embodiment of the present invention is presented. First, a user input 301 (e.g., from client computer 251 shown in FIG. 2) is input to a content reading and clarification interface 303 (e.g., running on content clarification server 201 shown in FIG. 2).

The content reading and clarification interface 303 interprets the user input 301 as a request for clarification of the user-chosen content segment reflected in user input 301, as shown in block 305. The content reading and clarification interface 303 utilizes NLP-based concept extraction (block 307) and/or extractive/abstractive content summarization (block 309) on the content segment, and marks concepts that require alternatives (e.g., phrasing that needs clarification), as shown in block 311.

Once the marked concepts are defined, they are sent to Bid Generation Backend Housed at all the Content Sponsors 353 (e.g., that are running on the content clarification provider servers 253 shown in FIG. 2). More specifically, the marked concepts are submitted as bid inputs that include the concept set for replacement, summaries, and/or the main text of the content, as shown in block 313. A natural language driven sponsored in-house clarified content generator (see block 315) receives content clarification from a content clarification knowledge database 317, which is then supplied to a bid value generator based on the sponsored content quality, the level of match between the clarified content and what the original content meant, etc. (block 319), based on a past bid win/loss history database 321. That is, if a particular content sponsor (element 353) has a high success of being selected to provide the clarification for content, then it will charge a high fee for this clarification.

As such, the content sponsor generates the clarification and a bid for use thereof (block 323), and sends it to the content clarification server 201, which scores each bid received from the various content sponsors based on the bid amounts and the accuracy of the clarification text supplied by the different content sponsors (block 325).

As shown in block 327, a winning bid is selected using the winner's text, which is 1) sent back to the context sponsor in order to update the database 321 (block 329) and 2) sent as a system output 331 to the client computer 251 shown in FIG. 2.

Figure 4:
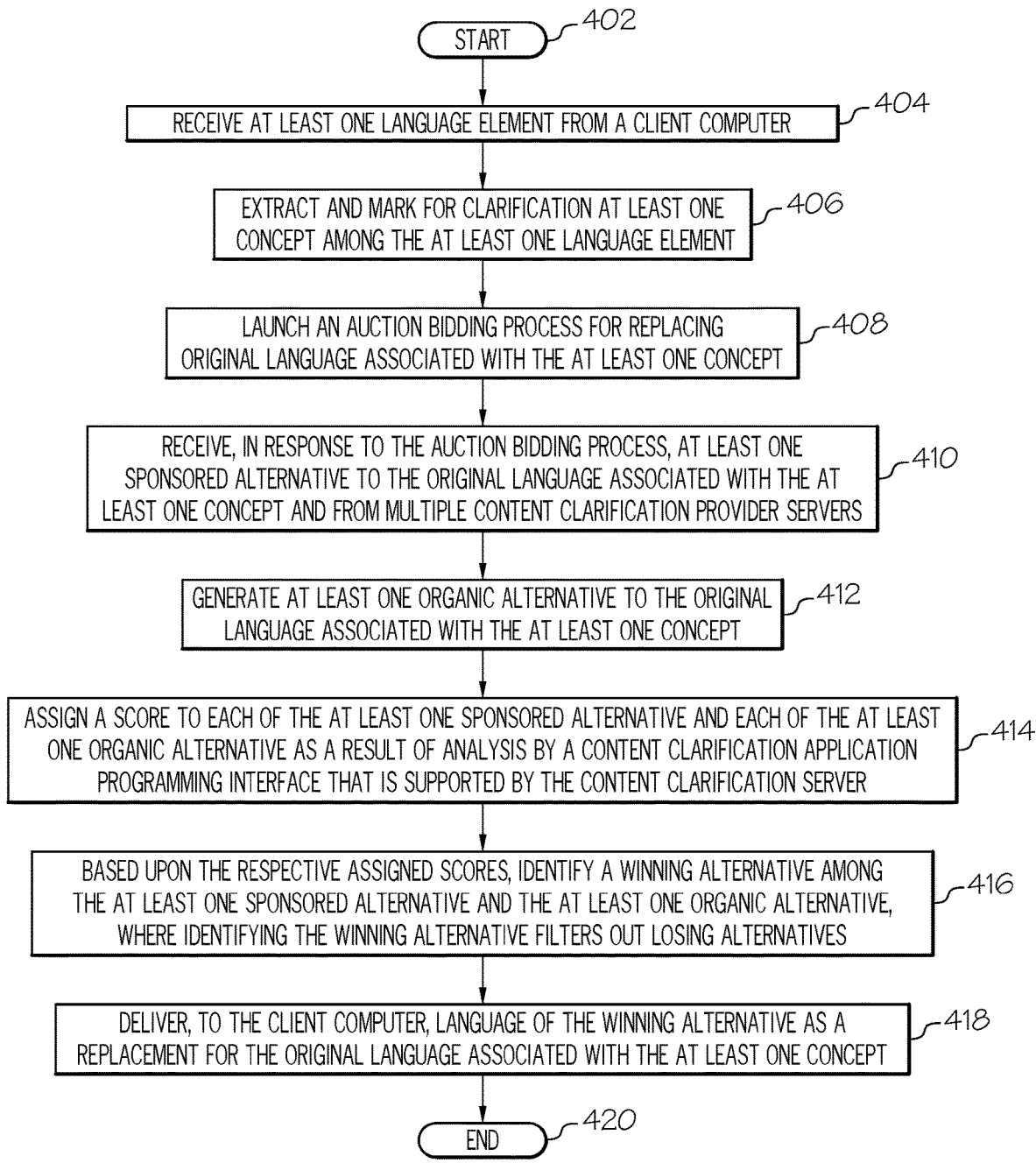
FIG. 4 is a high-level flow chart of one or more steps performed by one or more processors and/or other hardware devices in accordance with one or more embodiments of the present invention.

With reference now to FIG. 4, a high-level flow chart of one or more steps performed by one or more processors and/or other hardware devices in accordance with one or more embodiments of the present invention is presented.

After initiator block 402, a content clarification server (e.g., content clarification server 201 shown in FIG. 2) receives at least one language element (e.g., content 202 shown in FIG. 2) from a client computer (e.g., client computer 251 shown in FIG. 2), as described in block 404.

As described in block 406, the content clarification server extracts and marks for clarification at least one concept among the at least one language element. For example, the concepts "education" and "perfection" may be extracted from content 202.

As described in block 408, the content clarification server launches an auction bidding process (e.g., to the content clarification provider servers 253 shown in FIG. 2) for replacing original language associated with the at least one concept.

As described in block 410, in response to the auction bidding process, the content clarification server receives at least one sponsored alternative to the original language associated with the at least one concept from multiple content clarification provider servers, as described above.

As described in block 412, the content clarification server generates at least one organic alternative to the original language associated with the at least one concept. This organic alternative is generated by the content clarification server 201 itself. In one embodiment, the organic alternative is based on a profile of a user of the client computer 251 that selected the content 202 for clarification. That is, if the profile of this user shows that the user is a human resources professional, then the content 202 (e.g., "Education is the manifestation of perfection that is already in mankind") may be automatically (computer-based) paraphrased as an organic alternative by content clarification server 201 as "Education optimizes the efficiency of human resources". In one embodiment, the profile of the user of the client computer 251 may also be used by the content clarification provider servers 253 to automatically generate sponsored alternatives.

In one embodiment, the content clarification server 201 uses the profile of the user of client computer 251 to screen which of the content clarification provider servers 253 are allowed to bid on providing the sponsored alternatives. For example, if a first content clarification provider is from an enterprise that specializes in human resources, and another second content clarification provider is from an enterprise that specializes in medicine, and the profile of the user of the client computer 251 shows that he/she is a human resources manager, then content clarification server 201 may filter out (not use) any responses submitted by the second content clarification provider while accepting responses submitted by the first content clarification provider, since the second content clarification provider is unlikely to provide a response that will be helpful to a human resources manager while the first content clarification provider is likely to provide a response that is helpful to a human resources manager.

As described in block 414, the content clarification server assigns a score to each of the at least one sponsored alternative and each of the at least one organic alternative as a result of analysis by a content clarification application programming interface that is supported by the content clarification server. That is, the clarification generated by the content clarification server 201 (organic alternative) and the clarification supplied by the content clarification provider servers 253 (sponsored alternative) are given scores based on their past history of providing useful clarifications, their costs, etc.

As described in block 416, based upon the respective assigned scores, the content clarification server identifies a winning alternative among the at least one sponsored alternative and the at least one organic alternative, such that identifying the winning alternative filters out losing alternatives. As such, all filtering is performed by the content clarification server based on parameters (i.e., the content 202 and/or the profile of the user who is requesting the clarification) set at the client computer 251.

As described in block 418, the content clarification server then delivers, to the client computer, language/text/content of the winning alternative (clarifying content/language) as a replacement for the original language/text/content associated with the at least one concept.

The flow-chart ends at terminator block 420.

In an embodiment of the present invention, extracting and marking the at least one concept comprises extracting an entirety of the at least one language element. That is, in this embodiment all of the words in the content 202 are deemed to be relevant, and thus provided to all potential clarification sources.

In an embodiment of the present invention, extracting and marking the at least one concept comprises applying natural language processing to the at least one language element to identify the at least one concept and to generate an abstractive/extractive summarization associated with the at least one concept, as described above. That is, in this embodiment the original content is summarized and otherwise reduced in order to identify key concepts in the original content.

In an embodiment of the present invention, launching the auction bidding process comprises providing to potential bidders the at least one language element, the at least one concept, and any abstractive/extractive summarization associated with the at least one concept. That is, the content clarification providers are provided with an actual word/phrase from the original content ("at least one language element"), a concept of the original content, which is generated by the content clarification server using natural language context processing ("at least one concept"), and a summary of the original content as generated by the content clarification server ("any abstractive/extractive summarization associated with the at least one concept").

In an embodiment of the present invention, at least one sponsored alternative includes a text alternative to the original language associated with the at least one concept and a monetary bid value for inclusion of advertising content. That is, the content clarification providers provide both their proposed clarification content as well as a bid of how much they will pay to include an advertisement along with their clarification content when displayed on the client computer 251.

In an embodiment of the present invention, assigning a score to each of the at least one sponsored alternative and each of the at least one organic alternative includes: assigning a default monetary bid value to each of the at least one organic alternative; applying a function to each of the at least one sponsored alternative and each of the at least one organic alternative based upon one or more factors selected from: (i) compatibility of the alternative with the at least one language element, (ii) information value of the alternative, (iii) simplicity of the alternative, and (iv) monetary bid value; and determining a score for each of the at least one sponsored alternative and each of the at least one organic alternative based upon output of the function. That is, the content clarification server 201 will set a default monetary value to the organic alternative that it generates ("assigning a default monetary bid value to each of the at least one organic alternative"). The content clarification server 201 will then determine the relative worth of its organic alternative and the clarifications supplied by the content clarification provider servers 253 (applying a function to each of the at least one sponsored alternative and each of the at least one organic alternative based upon one or more factors selected from: (i) compatibility of the alternative with the at least one language element, (ii) information value of the alternative, (iii) simplicity of the alternative, and (iv) monetary bid value), and will then assign a score to each of the clarifications (organic and sponsored) ("determining a score for each of the at least one sponsored alternative and each of the at least one organic alternative based upon output of the function"). The clarification that receives the highest score is then sent to the client computer 251.

Thus, the present invention as described provides a technological improvement and advantage over the prior art by 1) providing alternative clarifications to a concept found in a passage, while 2) reducing the load on the user's computer and 3) minimizing the impact on the network bandwidth between the content clarification server and the client computer by sending only "winning" clarifications.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
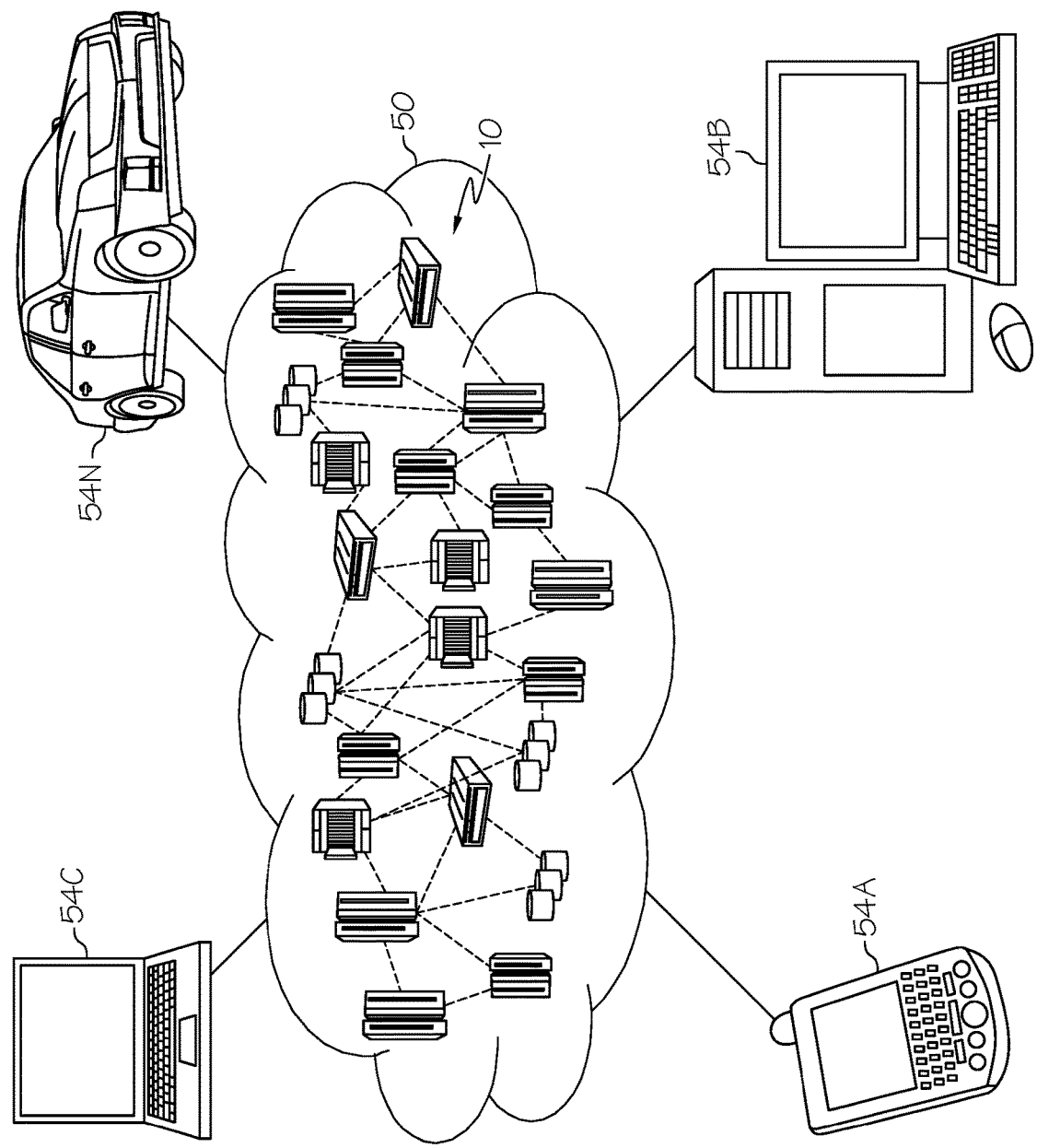
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
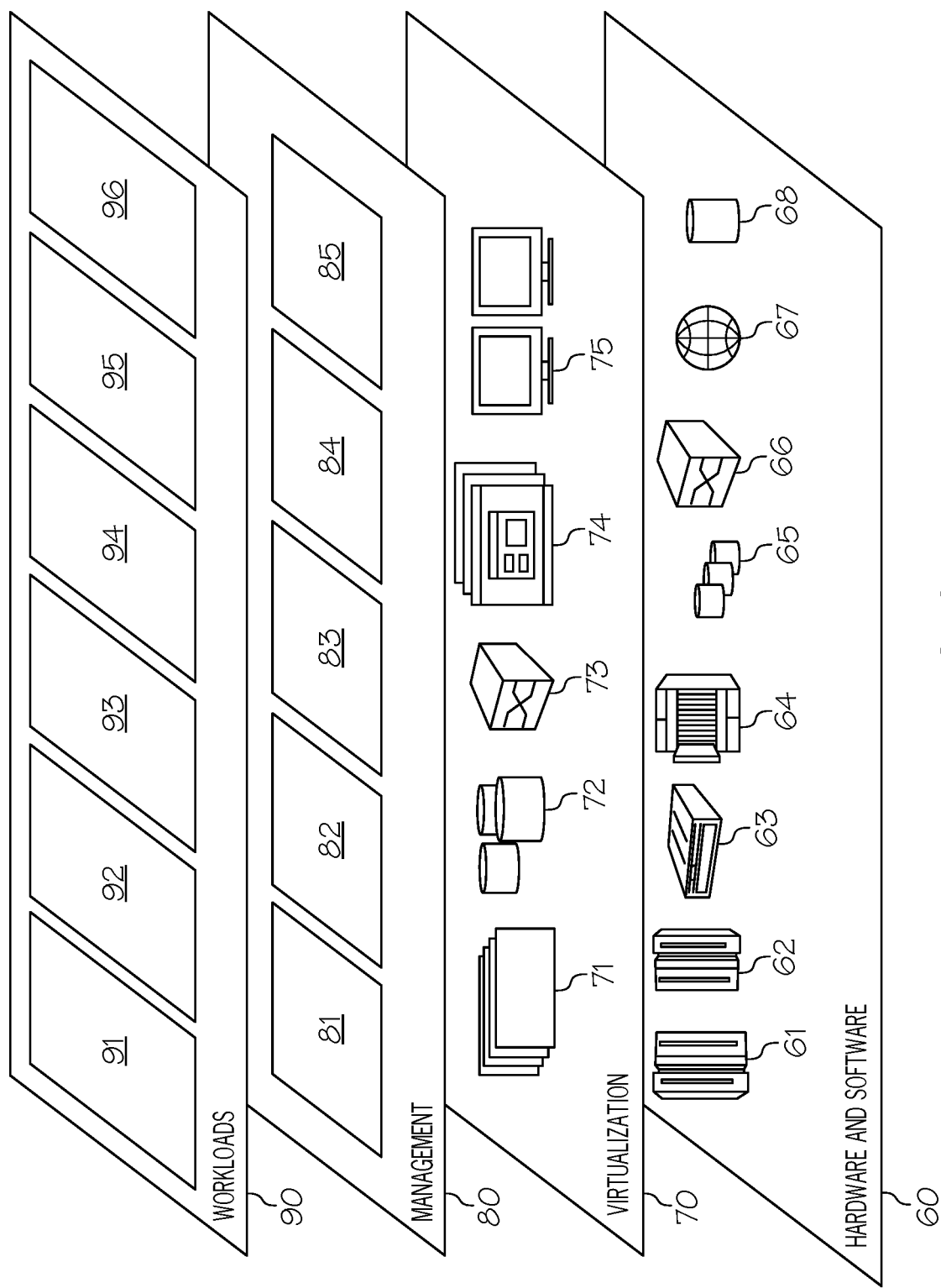
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content clarification processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
receiving, by a content clarification server, at least one language element from a client computer, wherein the at least one language element is a string of multiple words;
extracting and marking for clarification, by the content clarification server, at least one concept among the at least one language element;
launching, by the content clarification server, an auction bidding process for replacing original language associated with the at least one concept;
receiving, in response to the auction bidding process and by the content clarification server, at least one sponsored alternative to the original language associated with the at least one concept from multiple content clarification provider servers;

generating, by the content clarification server, at least one organic alternative to the original language associated with the at least one concept;

assigning, by the content clarification server, a score to each of the at least one sponsored alternative and each of the at least one organic alternative as a result of analysis by a content clarification application programming interface that is supported by the content clarification server;

based upon the respective assigned scores, identifying, by the content clarification server, a winning alternative among the at least one sponsored alternative and the at least one organic alternative, wherein identifying the winning alternative filters out losing alternatives;

delivering, from the content clarification server to the client computer, language in the winning alternative as a replacement for the original language associated with the at least one concept;

determining, by the content clarification server, a subject matter expertise of a user who provided the at least one language element from the client computer; and restricting, by the content clarification server, the auction bidding process to only content clarification providers who have the subject matter expertise of the user who provided the at least one language element from the client computer.

2. The method of claim 1, wherein extracting and marking the at least one concept comprises extracting an entirety of the at least one language element.

3. The method of claim 1, wherein extracting and marking the at least one concept comprises applying natural language processing to the at least one language element to identify the at least one concept and to generate an abstractive summarization associated with the at least one concept, wherein the abstractive summarization paraphrases the at least one language element by using a fewer number of words than a number of words that are in the at least one language element.

4. The method of claim 1, wherein launching the auction bidding process comprises providing to potential bidders the at least one language element, the at least one concept, and an abstractive summarization associated with the at least one concept.

5. The method of claim 1, wherein the at least one sponsored alternative includes a text alternative to the original language associated with the at least one concept and a monetary bid value for inclusion of advertising content.

6. The method of claim 1, wherein assigning the score to each of the at least one sponsored alternative and each of the at least one organic alternative comprises:
   assigning, by the content clarification server, a default monetary bid value to each of the at least one organic alternative;
   applying, by the content clarification server, a function to each of the at least one sponsored alternative and each of the at least one organic alternative based upon one or more factors selected from: (i) compatibility of the alternative with the at least one language element, (ii) information value of the alternative, (iii) simplicity of the alternative, and (iv) monetary bid value; and
   determining, by the content clarification server, a score for each of the at least one sponsored alternative and each of the at least one organic alternative based upon output of the function.

7. The method of claim 1, wherein the at least one organic alternative is based on a profile of a user of the client computer that provided the at least one language element.

8. The method of claim 1, wherein the winning alternative is a photograph of the at least one language element.

9. The method of claim 1, wherein the at least one language element is a phrase that describes a device, and wherein the winning alternative is an audio clip of an activity associated with the device.

10. A computer program product for filtering clarification content, the computer program product comprising a non-transitory computer readable storage device having program instructions embodied therewith, the program instructions readable and executable by a computer to perform a method comprising:
    receiving, by a content clarification server, at least one language element from a client computer, wherein the at least one language element is a string of multiple words;
    extracting and marking for clarification, by the content clarification server, at least one concept among the at least one language element;
    launching, by the content clarification server, an auction bidding process for replacing original language associated with the at least one concept;
    receiving, in response to the auction bidding process and by the content clarification server, at least one sponsored alternative to the original language associated with the at least one concept from multiple content clarification provider servers;
    generating, by the content clarification server, at least one organic alternative to the original language associated with the at least one concept;
    assigning, by the content clarification server, a score to each of the at least one sponsored alternative and each of the at least one organic alternative as a result of analysis by a content clarification application programming interface that is supported by the content clarification server;
    based upon the respective assigned scores, identifying, by the content clarification server, a winning alternative among the at least one sponsored alternative and the at least one organic alternative, wherein identifying the winning alternative filters out losing alternatives;
    delivering, from the content clarification server to the client computer, language of the winning alternative as a replacement for the original language associated with the at least one concept;
    determining, by the content clarification server, a subject matter expertise of a user who provided the at least one language element from the client computer; and
    restricting, by the content clarification server, the auction bidding process to only content clarification providers who have the subject matter expertise of the user who provided the at least one language element from the client computer.

11. The computer program product of claim 10, wherein extracting and marking the at least one concept comprises applying natural language processing to the at least one language element to identify the at least one concept and to generate an abstractive summarization associated with the at least one concept.

12. The computer program product of claim 10, wherein launching the auction bidding process comprises providing to potential bidders the at least one language element, the at least one concept, and an abstractive summarization associated with the at least one concept.

13. The computer program product of claim 10, wherein assigning the score to each of the at least one sponsored alternative and each of the at least one organic alternative comprises:
- assigning a default monetary bid value to each of the at least one organic alternative;
- applying a function to each of the at least one sponsored alternative and each of the at least one organic alternative based upon one or more factors selected from: (i) compatibility of the alternative with the at least one language element, (ii) information value of the alternative, (iii) simplicity of the alternative, and (iv) monetary bid value; and
- determining a score for each of the at least one sponsored alternative and each of the at least one organic alternative based upon output of the function.

14. The computer program product of claim 10, wherein the program instructions are provided as a service in a cloud environment.

15. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
- program instructions to receive at least one language element from a client computer, wherein the at least one language element is a string of multiple words;
- program instructions to extract and mark for clarification at least one concept among the at least one language element;
- program instructions to launch an auction bidding process for replacing original language associated with the at least one concept;
- program instructions to receive, in response to the auction bidding process, at least one sponsored alternative to the original language associated with the at least one concept from multiple content clarification provider servers;
- program instructions to generate at least one organic alternative to the original language associated with the at least one concept;
- program instructions to assign a score to each of the at least one sponsored alternative and each of the at least one organic alternative as a result of analysis by a content clarification application programming interface that is supported by the content clarification server, wherein assigning the score to each of the at least one sponsored alternative and each of the at least one organic alternative comprises:
- assigning, by the content clarification server, a default monetary bid value to each of the at least one organic alternative;
- applying, by the content clarification server, a function to each of the at least one sponsored alternative and each of the at least one organic alternative based upon: (1) relevance with respect to the at least one language element; (2) grammar structure similarity of the at least one language element compared to the at least one sponsored alternative and the at least one organic alternative; (3) stylistic similarity of the at least one language element compared to the at least one sponsored alternative and the at least one organic alternative; and (4) information contained in the at least one sponsored alternative and the at least one organic alternative; and
- determining, by the content clarification server, a score for each of the at least one sponsored alternative and each of the at least one organic alternative based upon output of the function;
- program instructions to, based upon the respective assigned scores, identify a winning alternative among the at least one sponsored alternative and the at least one organic alternative, wherein identifying the winning alternative filters out losing alternatives; and
- program instructions to deliver, to the client computer, language of the winning alternative as a replacement for the original language associated with the at least one concept.

16. The computer system of claim 15, wherein extracting and marking the at least one concept comprises applying natural language processing to the at least one language element to identify the at least one concept and to generate a summarization associated with the at least one concept.

17. The computer system of claim 15, wherein launching the auction bidding process comprises providing to potential bidders the at least one language element, the at least one concept, and a summarization associated with the at least one concept.

18. The computer system of claim 15, wherein the stored program instructions are provided as a service in a cloud environment.

* * * * *